(12) United States Patent
Hordys et al.

(10) Patent No.: US 10,805,779 B2
(45) Date of Patent: Oct. 13, 2020

(54) COMPUTER-IMPLEMENTED METHOD FOR IMPLEMENTING A V2X APPLICATION AND CORRESPONDING V2X BLOCKS FOR A GRAPHICAL MODELING ENVIRONMENT

(71) Applicant: dSPACE digital signal processing and control engineering GmbH, Paderborn (DE)

(72) Inventors: Gregor Hordys, Bad Lippspringe (DE); Andre Rolfsmeier, Bad Lippspringe (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 197 days.

(21) Appl. No.: 15/265,883

(22) Filed: Sep. 15, 2016

(65) Prior Publication Data

US 2017/0006404 A1    Jan. 5, 2017

Related U.S. Application Data

(63) Continuation of application No. PCT/EP2015/056731, filed on Mar. 27, 2015.

(30) Foreign Application Priority Data

Mar. 27, 2014 (EP) ..................... 14162150

(51) Int. Cl.
*H04W 4/50* (2018.01)
*H04W 4/40* (2018.01)
(Continued)

(52) U.S. Cl.
CPC ................ *H04W 4/50* (2018.02); *G06F 8/34* (2013.01); *G06F 8/35* (2013.01); *H04B 1/3822* (2013.01); *H04W 4/40* (2018.02); *H04W 84/18* (2013.01)

(58) Field of Classification Search
CPC .. G06F 8/34; G06F 8/35; H04W 4/40; H04W 4/50; H04W 84/18; H04B 1/3822
See application file for complete search history.

(56) References Cited

U.S. PATENT DOCUMENTS 7,257,640 B1 * 8/2007 Callocchia .......... H04L 41/0896
370/235
7,424,684 B2 9/2008 Orofino, II et al.
(Continued)

FOREIGN PATENT DOCUMENTS

CN      106104471 A    11/2016
JP      2006523901 A   10/2006
(Continued)

OTHER PUBLICATIONS

Extended European Search Report for European Application No. 14162150.8 dated Jun. 26, 2014 with English translation.
(Continued)

*Primary Examiner* — S. Sough
*Assistant Examiner* — Stephen D Berman
(74) *Attorney, Agent, or Firm* — Muncy, Geissler, Olds & Lowe, P.C.

(57) ABSTRACT

A computer-implemented method for implementing a V2X application on target hardware having a radio adapter, wherein the V2X application is modeled in the form of a block diagram by means of a graphical modeling environment and the block diagram is compiled into a V2X program that can be executed on the target hardware and the V2X program is transferred to the target hardware and executed there. The method for implementing a V2X application is realized in an especially simple and advantageous manner in that a V2X communication block that has at least one radio adapter interface, by means of which data are exchanged
(Continued)

between the radio adapter and the V2X communication block, is used to create the block diagram.

25 Claims, 8 Drawing Sheets

(51) Int. Cl.
    *G06F 8/35*     (2018.01)
    *H04W 84/18*     (2009.01)
    *G06F 8/34*     (2018.01)
    *H04B 1/3822*     (2015.01)

(56) References Cited

U.S. PATENT DOCUMENTS

| | | | |
|---|---|---|---|
| 7,729,827 B2 | 6/2010 | Sakurai et al. | |
| 7,798,901 B2 | 9/2010 | Nguyen et al. | |
| 8,015,543 B1 | 9/2011 | Carrick et al. | |
| 8,165,745 B2 | 4/2012 | Sakurai et al. | |
| 8,204,732 B1* | 6/2012 | Simsek | G06F 8/34 703/16 |
| 8,516,121 B1* | 8/2013 | Telang | H04L 67/1097 707/640 |
| 8,705,527 B1* | 4/2014 | Addepalli | H04W 72/0406 370/389 |
| 2003/0139186 A1* | 7/2003 | Igarashi | H04W 36/08 455/438 |
| 2004/0005859 A1* | 1/2004 | Ghercioiu | G06F 8/60 455/3.01 |
| 2007/0294074 A1 | 12/2007 | Ciolfi | |
| 2009/0282384 A1 | 11/2009 | Keppler | |
| 2011/0069694 A1* | 3/2011 | Skyman | G06F 17/142 370/343 |
| 2012/0188964 A1* | 7/2012 | Zhang | H04W 72/0406 370/329 |
| 2013/0167119 A1 | 6/2013 | Lee et al. | |
| 2013/0282238 A1 | 10/2013 | Ricci et al. | |
| 2013/0332864 A1* | 12/2013 | Correll | G06F 8/34 715/763 |
| 2014/0002276 A1* | 1/2014 | Iyer | H04W 4/90 340/901 |
| 2014/0055288 A1* | 2/2014 | Menzel | G08G 1/0112 340/936 |
| 2014/0274182 A1* | 9/2014 | Menzel | H04B 7/0871 455/509 |
| 2015/0018027 A1* | 1/2015 | Noh | G08G 1/161 701/408 |
| 2015/0112543 A1* | 4/2015 | Binion | B60W 40/10 701/32.2 |
| 2015/0120083 A1* | 4/2015 | Gurovich | G07C 5/008 701/1 |
| 2017/0006404 A1 | 1/2017 | Hordys et al. | |

FOREIGN PATENT DOCUMENTS

| | | |
|---|---|---|
| JP | 2007502658 A | 2/2007 |
| JP | 2007126127 A | 5/2007 |

OTHER PUBLICATIONS

Festag et al., "Car-2-X Communication SDK-A Software Tool for Rapid Application Development and Experimentations," IEEE Int'l Conf on Comm (ICC 2009), pp. 1-5 (Jun. 2009).
Bjoern Schuenemann, "V2X simulation runtime infrastructure VSimRTI: An assessment tool to design smart traffic management systems," Computer Networks, vol. 55, No. 14, pp. 3189-3198 (Jan. 1, 2011).
Japanese Office Action dated Jan. 11, 2019 in corresponding application 2017-501493.
Chinese Office Action issued by Chinese Patent Office dated Feb. 28, 2019 in corresponding application 201580012411.5.
Chinese Office Action for Chinese Application No. 201580012411.5 dated May 6. 2020 with English translation.
Zhang Liyun, Editor, "6.5 Internet Control Message Protocol, ICMP," *Basic Course for Computer Network*, Beijing Jiaotong Univ Press, pp. 202-206 (Aug. 31, 2006) cited and discussed in English translation of Chinese Office Action at p. 4 (sequence p. 6).

* cited by examiner

COMPUTER-IMPLEMENTED METHOD FOR IMPLEMENTING A V2X APPLICATION AND CORRESPONDING V2X BLOCKS FOR A GRAPHICAL MODELING ENVIRONMENT

This nonprovisional application is a continuation of International Application No. PCT/EP2015/056731, which was filed on Mar. 27, 2015, and which claims priority to European Patent Application No. 14162150.8, which was filed in Europe on Mar. 27, 2014, and which are both herein incorporated by reference.

BACKGROUND OF THE INVENTION

Field of the Invention

The invention relates to a computer-implemented method for implementing a V2X application on target hardware having a radio adapter, wherein the V2X application is modeled in the form of a block diagram by means of a graphical modeling environment. The invention also relates to various blocks for use in a graphical modeling environment by means of which a V2X application can be modeled and implemented.

Description of the Background Art

The invention derives from the field of control unit development; it is less concerned here with the hardware development of a control unit, instead relating to the development and testing of control functionality in the broadest sense on a control unit. The term "control functionality" should not be understood in the narrow system theory sense: what is meant is any intentional exertion of influence on a technical process connected to the control unit. This also can be the processing and/or fusion of sensor data, for instance from environmental sensors.

The associated development passes through different phases, which are part of the so-called V-model. Normally the desired control functionality is first represented abstractly by a mathematical model as part of offline simulations—no connection to the real process, no real-time requirement—wherein not only the open-loop and closed-loop control aspect but also the physical technical process to be influenced are represented mathematically, normally with block diagrams, and are simulated with the aid of numerical methods.

In another step, the control functionality is converted into program code and implemented on target hardware that generally differs greatly from the production control unit that will later be used. The target hardware is typically more powerful than production control units so that it is always ensured that the hardware does not represent a limiting factor in the setup during testing of the control functionality to be implemented. In any event, the target hardware thus instrumented is tested in conjunction with the technical process to be influenced. The target hardware does not necessarily have to differ from the hardware on which the graphical modeling environment is operated and/or with which the translation into an executable V2X program takes place; in this case, the transfer to the target hardware is then extremely short, the program has merely to be loaded and executed. The target hardware can thus also be a PC, including the PC on which the modeling environment is executed and/or on which the translation of the model/block diagram into an executable program takes place.

As soon as the production target hardware, which is to say the production control unit, is available, the control algorithm to be implemented is generated for this target hardware, where the production control unit is not at first tested in conjunction with the actual physical process, but instead with a simulated process environment as part of a hardware-in-the-loop test (HIL test). Once the HIL test has been completed successfully, the target hardware in the form of the production control unit is tested in the real physical process, which is to say in the motor vehicle in the present case, wherein additional adjustments in the parameterization may take place here if applicable.

It is important for all development steps that the abstract control process known from the block diagram—a control functionality in the sense explained above, which can also include a sensor data analysis or data fusion—is no longer translated manually into program code, but instead that this transfer takes place through an automated code generation process from the block diagram. In this way, error-prone manual transfer is avoided, and rapid test cycles with varying control functionality are made possible. The functionality of the block diagrams or of the blocks of the block diagrams themselves can be implemented very differently. It is possible for the functionality of a block diagram to be implemented internally with further block diagrams and blocks of elementary functionality—in sub- and sub-sub-block diagrams and blocks, etc.—, but it is also possible for the functionality of a block diagram itself to be stored in a high-level programming language or description language; the details aren't important here.

With the graphical modeling and simulation environments in common use today, virtually any desired functionalities can be emulated by using the available elementary operations (basic arithmetic operations, differential and integral operations, bit manipulation, lookup tables, etc.), including, for example, the bus communication between control units or a sensor data analysis and fusion. Also, program code, for example C/C++ or C# code, can be stored in blocks. Examples of development environments that are based on block diagrams include Simulink (The MathWorks), ConfigurationDesk (dSPACE), ADTF (Automotive Data and Time-Triggered Framework, Elektrobit), and RTMaps (Real-Time Multisensor Advanced Prototyping Software, Intempora).

When it is said that the block diagram is translated into a V2X program that can be executed on the target hardware, this can also mean, for example, a program that is interpreted on the target hardware for execution; this, too, is an executable V2X program.

It is generally of interest in control unit development to be able to represent in a graphical modeling environment even those technologies that are not yet part of the established state of the art. One such new, but not yet established, technology is V2X technology, which is understood as the communication of a vehicle (V=vehicle) with its environment. This may include communication with other nearby vehicles (V2V) and/or communication with immovable communication partners (V2Infrastructure). The vehicles can be road vehicles, for example, so in this case we can speak of Car2X applications. The environment can involve vehicles of the same type, but can also include different road users (for example VRU=vulnerable road user, such as, e.g., pedestrians, bicycles, wheelchairs). However, the environment can also have other objects and communication devices, including, for example, backend servers in the cloud.

The representation of such a V2X communication with the elementary operations of a graphical modeling environment in each individual case of modeling of a V2X application is unlimited in its complexity and is labor-intensive, so the object of the present invention is to provide a computer-implemented method for implementing a V2X application on target hardware in which the implementation effort is reduced.

SUMMARY OF THE INVENTION

It is therefore an object of the invention to provide a computer-implemented method for implementing a V2X application on target hardware having a radio adapter, wherein the V2X application is modeled in the form of a block diagram by means of a graphical modeling environment, and the block diagram is translated into a V2X program that can be executed on the target hardware, and the V2X program is transferred to the target hardware and executed there, wherein, in order to create the block diagram, a V2X communication block is used that has at least one radio adapter interface by means of which data are exchanged between the radio adapter and the V2X communication block.

In terms of its concept, this method is independent of specific communication standards, protocols, and specialized definitions and implementations of physical layers. The method can be implemented in practice with any desired standards and can be adapted to any desired standards. Of course, it does not matter if the entire functionality is represented with a single V2X communication block in the block diagram. Different functionalities can of course also be distributed among multiple V2X communication blocks; this may be advantageous for reasons of clarity, for example.

The result of the method according to the invention is thus target hardware on which a V2X application is executed, wherein the V2X communication block used in accordance with the invention automatically ensures that the target hardware, which includes a radio adapter, can use the radio adapter readily, in particular without itself needing to model and react to a response of the radio adapter by means of elementary operations that go into detail here; in this way a substantial simplification is achieved for the implementation of V2X applications.

Any desired radio standard, and thus any desired wireless communication technology, can be implemented. It may involve a WLAN application (for example in residential buildings, warehouses), mobile phone solutions are possible (GSM, CDMA, GPRS, LTE; applications on roads, in air space), but RFID applications may also be included (for example in residential buildings, hospitals, warehouses, shipping facilities, etc.); this depends very much on the specific application case.

The target hardware itself can include the radio adapter in an integrated hardware solution, but the target hardware can also be connected to a radio adapter through a separately implemented hardware interface. When it is said here that the block diagram created with the graphical modeling environment is translated into a V2X program that can be executed on the target hardware, then this program can be a program that is executable on a processor/microcontroller, but it can also be, for example, a hardware description with which a circuit structure is given the desired functionality through "hard wiring." Through the radio adapter interface, data can be transmitted to the radio adapter (sending), and data can equally well be directed from the radio adapter to the rest of the target hardware (receiving).

An embodiment of the method provides for the V2X communication block to exchange data with an application unit through at least one application interface, wherein the application unit can, in particular, be part of the block diagram. As a result, it is possible for the user of the method to implement a custom functionality that is related to the V2X communication in the application unit. By this means, a reaction to the data received with the V2X communication block can take place within the application, and in like manner results attained within the application can be communicated to the outside through the V2X communication block. The application unit can thus also have a transmitting and a receiving portion.

In an embodiment, the data transmitted through the application interface to the application unit can include, for example, information about an approaching vehicle, about an emergency vehicle located in a certain area—for example, a vehicle of this nature carrying out an official function—, the emergency response status of a vehicle—for instance, "siren activated," "securing accident site," etc. The data transmitted through the application interface can be encoded, for example through a plurality of digital signal lines or through an n-bit data word, wherein the meaning of the encoded message content is ascertained through, e.g., a lookup table.

In an embodiment of the method, provision is made that the rate at which data are transmitted to the radio adapter can be specified to the V2X communication block through at least one transmit rate interface. With this capability, a functionality can easily be implemented to reduce the transmit rate in order to counteract the flooding of the wireless communication channels that results when vehicle density, and hence information density, is too high. If the V2X communication block has a standard transmission rate of 10 Hz, for example, it is possible to specify to it through the transmit rate interface that it should only operate at a reduced transmit rate in the current traffic situation, for example at 5 Hz, 2 Hz, or even just 1 Hz. Where the signal for reducing the transmit rate originates is immaterial here; the signal can originate from the radio adapter itself, for example, if it detects a bandwidth problem.

In an embodiment of the method according to the invention, provision is made that all or a portion of protocol description data can be transmitted to the V2X communication block through at least one protocol interface. As a result, it is possible to adapt the V2X communication block to any desired protocols or to equip it with any desired protocols. Preferably the protocol description data are made available in Abstract Syntax Notation 1 (ASN.1) format. The communication functionality of the V2X communication block is at least partly defined by the protocol description data; a fixed, unchangeable communication functionality could also be implemented in the V2X communication block, for example, with the functionality defined through the protocol description data being added thereto.

Alternatively to the solution with a protocol interface, the protocol description data could be made permanently available in the model and be read out. In another alternative, a protocol file with protocol description data could be permanently linked into the model, for example in the form of an asn.1 file. No protocol interface at the V2X communication block is required in either of the additional alternatives.

In an embodiment of the method, data compression of the data to be sent can be performed in the V2X communication block, and, for example, also decompression of received compressed data. In particular, data compression using Packed Encoding Rules is performed in the case of ASN.1 compliant data.

At least one of the interfaces discussed above, which is to say the radio adapter interface, application interface, transmit rate interface, and protocol interface, can be implemented as a port of the V2X communication block, so that the interfaces can be handled with the usual tools of block-based graphical modeling environments and a use of the interface in question is already evident from the block diagram, for example in that a signal line is connected to the port in question.

In an embodiment of the method, provision is made that the radio adapter interface of the V2X communication protocol can be implemented on a protocol level above the bit transfer layer of the OSI reference model, thus for instance in the session layer, the presentation layer, or the application layer. In this case the layers of the OSI reference model closer to the hardware are implemented in the radio adapter.

In an embodiment of the method, provision is made that the communication between the V2X communication block and the radio adapter can be modeled using the UDP or TCP network protocol, and accordingly communication between the target hardware and the real radio adapter is implemented by the resulting V2X program using the UDP or TCP network protocol.

In an embodiment of the method, the V2X communication block cyclically sends data through the radio adapter interface, in particular data in the form of Cooperative Awareness Messages or Basic Safety Messages, which may be same-vehicle data that include the status and motion information of the vehicle. These or a portion thereof of the transmitted same-vehicle data can be received by other vehicles, for example, in order to create a motion profile of the surrounding road users. So that a motion profile can also be created between vehicles that have a high relative velocity to one another, it is advantageous to choose a cycle time that is not too long; in many cases a transmit rate of 10 Hz—which is to say a cycle time of 100 ms—can be appropriate.

Alternatively or in addition, provision is made in the proposed method that the V2X communication block transmits and/or receives data through the radio adapter interface in an event-driven manner, in particular in the form of Decentralized Environmental Notification Messages (DENM messages). Through event driven data transmission, it is possible to communicate in a targeted manner information that is not of interest in normal and error-free driving. Possible examples of a triggering event are emergency braking or a substantial vehicle defect.

The reduction in implementation effort for a V2X application is additionally achieved by the means that, in order to create the block diagram, a V2X motion profile block can be used that has at least one motion data interface by means of which motion data are provided from data received from other vehicles, in particular wherein the motion data include at least one of the following information items: position, velocity, acceleration, and direction of motion. The motion profile block can, for example, be based on an environment table in which data from vehicles in the environment are stored. Of course, additional information can also be stored in the motion profile block that does not originally have to do with the position or motion of the vehicle, but nevertheless do relate to the vehicle, e.g., status information such as the securing of an accident site by another vehicle or the like.

Within the modeling environment, the motion data of other vehicles in the surroundings can be accessed in a very simple way by means of the V2X motion profile block, with the result that a considerable simplification of the implementation of V2X applications is achieved.

In an embodiment of the method according to the invention, a simplification in the implementation of V2X applications can be achieved by the means that, in order to create the block diagram, a V2X same-vehicle motion profile block may be used that has at least one motion data interface by means of which the vehicle's own motion data are provided, in particular wherein the motion data include at least one of the following information items: position, velocity, acceleration, and direction of motion. In this way, the vehicle's own motion data can be accessed very easily within the model, and the data can also be transmitted to other road users, for example through transmission to the V2X communication block.

An even further simplification in the implementation of V2X applications is, in order to create the block diagram, a V2X same-vehicle data bus block can be used that has at least one data bus data interface by means of which all or a portion of the data from the data bus of the same vehicle are provided, in particular are provided to the V2X communication block, wherein the data bus is, for example, a data bus for networking the vehicle control units, in particular wherein the data bus operates in conformance with one of the following standards: CAN, TTCAN, CAN FD, Ethernet, or FlexRay. As a result of this measure, the vehicle's own internal control unit communication can be accessed through the V2X same-vehicle data bus block, for example by the application unit that the user of the method has created to implement his custom functionality. The use according to the invention of the V2X same-vehicle data bus block allows direct and deep access to the communications of the vehicle electronics.

It has also proven advantageous that, in order to create the block diagram, a V2X trigger block can be used that has at least one trigger input interface, at least one trigger output interface, and internal trigger logic, wherein the internal trigger logic analyzes information received through the trigger input interface and, as a function of the information received, outputs a trigger signal through the trigger output interface. The trigger signal can be used to particular advantage to initiate the sending of a message. In a special embodiment, the trigger logic is based on the standards of the Car 2 Car Communication Consortium, for example in the manner described in the document entitled Triggering Conditions Document.

A computer-implemented method for implementing a V2X application on target hardware is also provided, wherein the V2X application is modeled in the form of a block diagram by means of a graphical modeling environment, and the block diagram is translated into a V2X program that can be executed on the target hardware, and the V2X program is transferred to the target hardware and executed there, wherein, in order to create the block diagram, at least one V2X block is used that implements a V2X-specific functionality. All the previously identified advantages are attained by the the V2X block. The V2X block and its functionality are taken into account during the translation into the V2X program and are automatically implemented in the V2X program. Specifically, the V2X block can be a V2X communication block, a V2X motion profile block, a V2X same-vehicle motion profile block, a V2X same-vehicle data bus block, or a V2X trigger block, and accordingly the V2X-specific functionality can be the functionality described in detail above of a V2X communication block, of a V2X motion profile block, of a V2X same-vehicle motion profile block, of a V2X same-vehicle data bus block, or that of a V2X trigger block.

The object of the invention is also attained by various V2X blocks with which a V2X application can be described in the form of a block diagram by means of a graphical modeling environment, namely by a V2X communication block, a V2X motion profile block, a V2X same-vehicle motion profile block, a V2X same-vehicle data bus block, and a V2X trigger block.

For example, there are a plurality of possibilities for implementing and further developing the computer-implemented method according to the invention and the V2X blocks for a graphical modeling environment.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
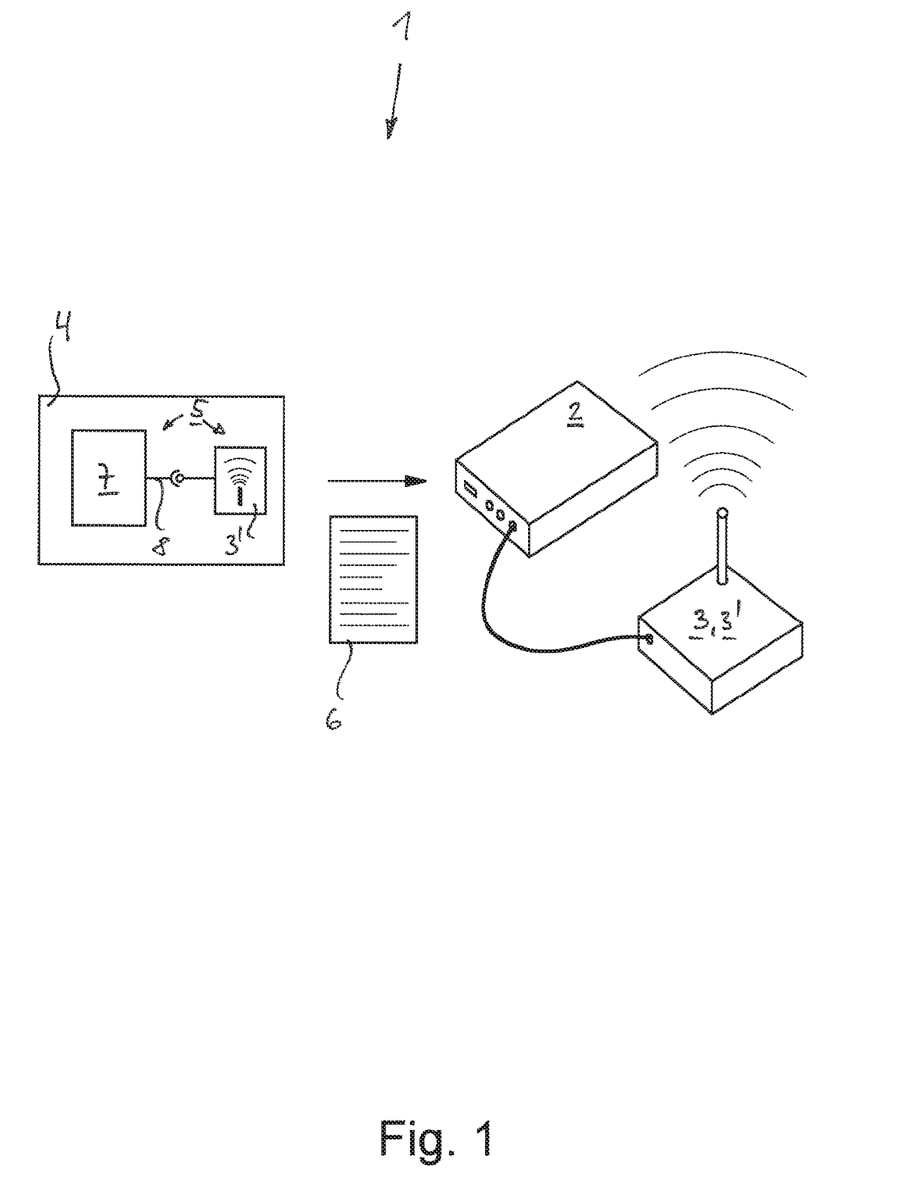
FIG. 1 shows a schematic representation of a computer-implemented method for implementing a V2X application on target hardware having a radio adapter.

Shown schematically in FIG. 1, firstly, is the sequence of the proposed computer-implemented method 1 for implementing a V2X application on target hardware 2 having a radio adapter 3, wherein the V2X application is modeled in the form of a block diagram 5 by means of a graphical modeling environment 4. The block diagram 5 and the V2X application modeled with it are first translated into a V2X program 6 that can be executed on the target hardware 2, and the V2X program 6 is then transferred to the target hardware 2 and executed there.

As a whole, this takes place through intermediate steps that are not shown in detail here: the block diagram 5 is analyzed and is first translated into program code, with the program code then being compiled, so that the result is the executable V2X program 6. The V2X program executed on the target hardware 2 thus implements the functionality of the V2X application previously modeled in the form of the block diagram 5 by means of the graphical modeling environment 4.

The radio adapter 3 is installed in the vehicle in question and represents the technical medium used to communicate either with other vehicles (Vehicle2Vehicle or, more specifically, Car2Car) or with other communication partners that are stationary (V2Infrastructure) such as, e.g., traffic lights, traffic jam reporting stations, etc.

As the vehicle in question moves through traffic, it creates an ad hoc network together with the other communication partners located within radio range, a network that by its nature is highly variable on account of the continually changing communication partners.

The implementation of a V2X application on the target hardware 2 is facilitated by the use of a V2X communication block 7, with which the block diagram 5 is—at least partly—created. The V2X communication block 7 contains an elementary communication functionality, which in the block diagram 5 can be employed through a radio adapter interface 8. By means of the radio adapter interface 8, data can be exchanged between the radio adapter 3 or the modeling equivalent 3' of the radio adapter 3 in the graphical modeling environment 4 and the V2X communication block 7. Because the V2X communication block 7 brings with it the requisite functionality for exchanging data with the radio adapter 3, 3', it is no longer necessary to model this functionality in detail with elementary operations of the modeling environment 4.

Shown in each of FIGS. 2 to 5 is a block diagram 5, with which a V2X application is modeled, where the graphical modeling environment is no longer explicitly shown. In all the diagrams, it is evident that the V2X communication block 7 serves to implement a V2X application in the form of a block diagram 5 in a graphical modeling environment, wherein the V2X communication block 7 has a radio adapter interface 8, by means of which data can be exchanged between the V2X communication block 7 and the modeled radio adapter 3' of the block diagram 5.

Figure 2:
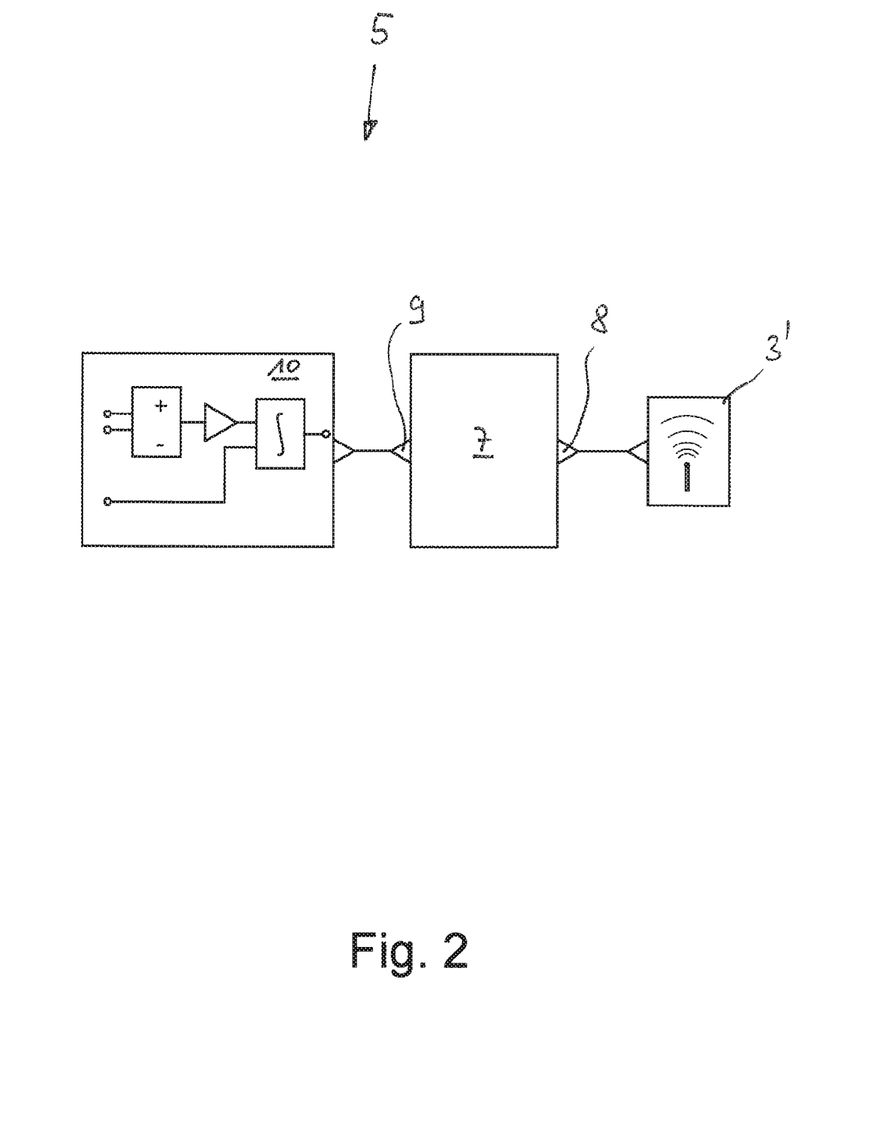
FIG. 2 schematically shows a block diagram of a graphical modeling environment with a V2X communication block, a radio adapter, and an application unit within the block diagram.

It can be seen in FIG. 2 that the V2X communication block 7 has an application interface 9, by means of which data can be exchanged with an application unit 10, wherein the application unit 10 is part of the block diagram 5 here. The application unit 10 accommodates the individual functionality of the V2X application to be implemented. By means of the V2X communication block 7 it is possible to establish the communication with other communication partners that is typical for V2X applications in a simple manner.

In the exemplary embodiments shown, all interfaces are shown as ports of blocks, so it is obvious from the signal line connections alone which block communicates with which other block. It is not necessarily the case that only a single signal can be transmitted over a signal line, it is also possible, for example, to transport a plurality of signals over one signal line; this is merely a question of representation in current modeling tools.

Figure 3:
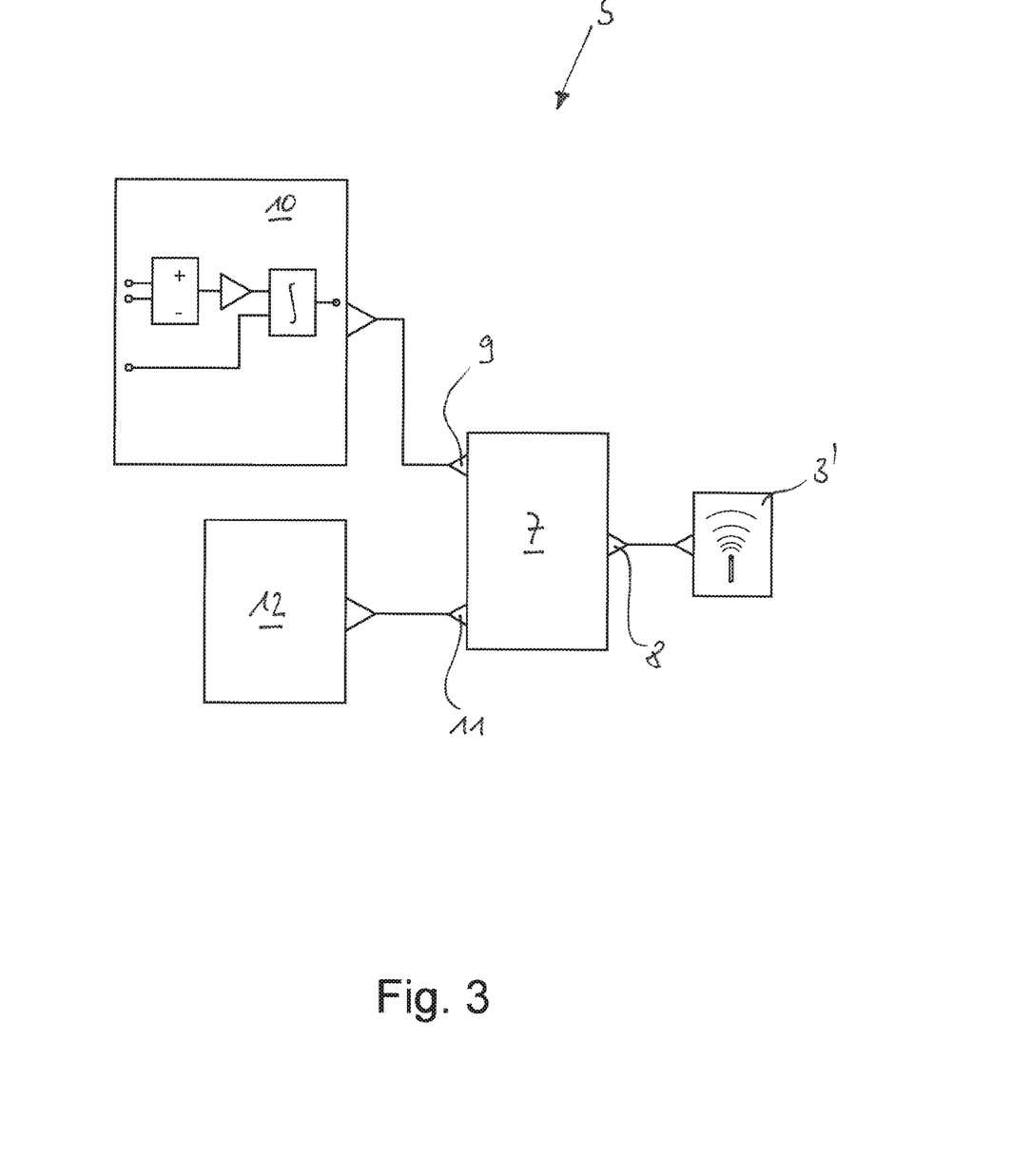
FIG. 3 shows a block diagram as in FIG. 2 with a V2X communication block with transmit rate interface.

FIG. 3 shows a V2X application in which the V2X communication block 7 has a transmit rate interface 11 through which the rate at which the V2X communication block 7 transmits data to the radio adapter 3' can be specified to the V2X communication block 7. After transfer of the block diagram 5 to the executable V2X program 6, this means of course that the corresponding functionality of the V2X communication block 7 then implemented on the target hardware 2 ensures that the target hardware 2 only transmits data at the specified rate through the radio adapter 3 and that the latter also only sends data at the specified rate; an exact correspondence between the block diagram and target hardware always exists to the greatest possible degree.

Figure 4:
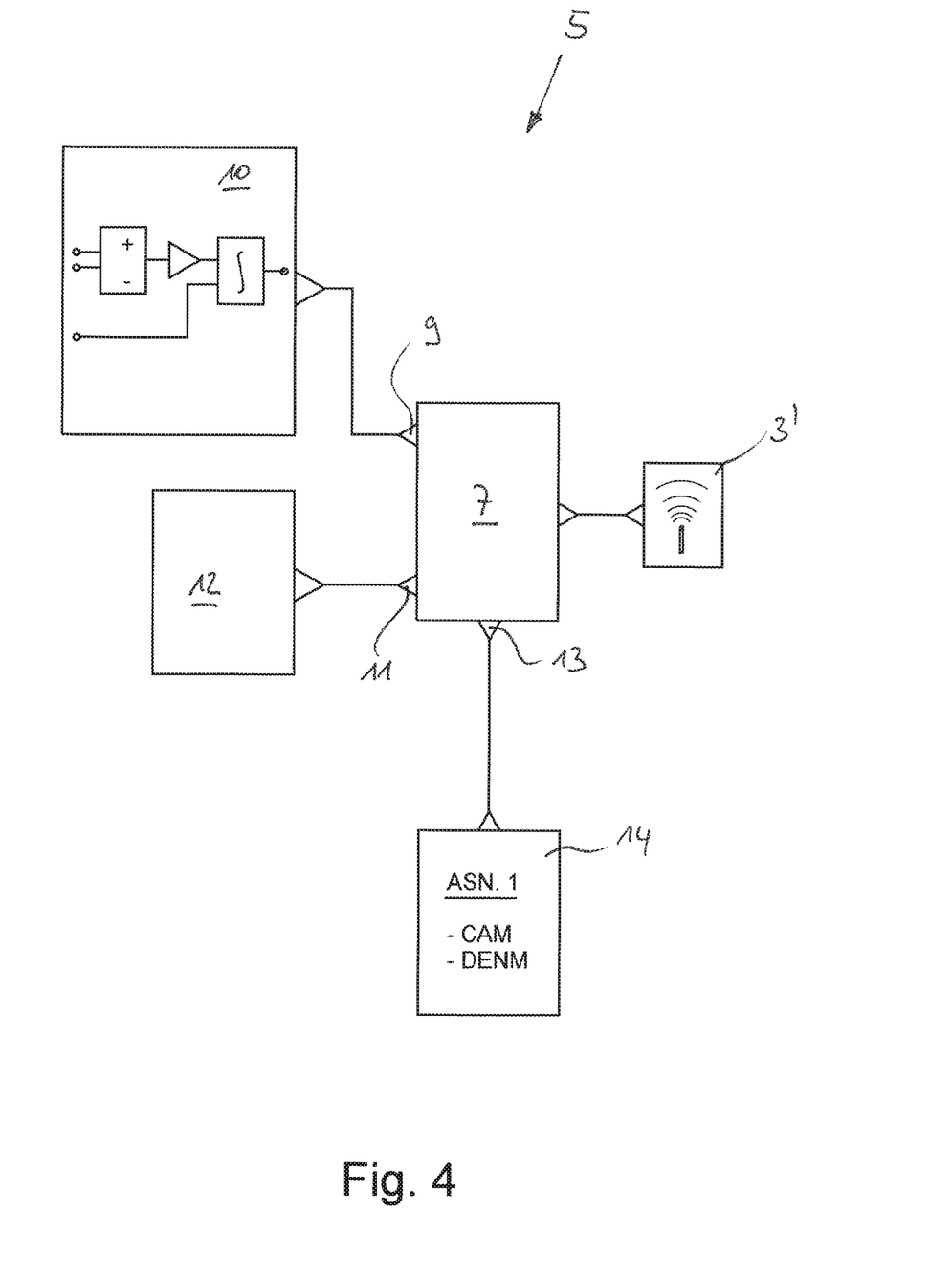
FIG. 4 shows a block diagram with a V2X communication block with protocol interface.

Shown in FIGS. 3 and 4 is that a transmit rate is specified to the V2X communication block 7 through the transmit rate interface 11 that derives from a DCC block 12 (Decentralized Congestion Control), wherein this DCC block 12 receives information about channel utilization, for example from the radio adapter 3, 3', and in this way ensures an appropriately adapted transmit rate.

In FIG. 4, the V2X communication block 7 is shown with extended functionality, because it has a protocol interface 13 through which protocol description data 14 can be transmitted to the V2X communication block 7. The protocol description data 14 are present here in ASN.1 (Abstract Syntax Notation One) format. The communication functionality of the V2X communication block 7 is at least partially defined by means of the protocol description data 14. The communication functionality of the V2X application later implemented on the target hardware is ultimately also determined by the definition of the communication functionality of the V2X communication block 7.

In the exemplary embodiments shown, the communication between the V2X communication block 7 and the radio adapter 3 or the model of the radio adapter 3' is implemented using the UDP network protocol. Accordingly, the connection shown in FIG. 1 between the target hardware 2 and the radio adapter 3 is an Ethernet-based connection that is implemented using the UDP network protocol.

The protocol description data 14 shown in FIG. 4 here contains a description of Cooperative Awareness Messages (CAM), which are sent cyclically through the radio adapter interface 8, and also a description of Decentralized Environmental Notification Messages (DENM), which is used by the V2X communication block 7 to send data in an event-driven manner through the radio adapter interface 8. The configuration of the V2X communication block 7 thus makes it possible that data can be sent in a cyclic and event-driven manner through the radio adapter interface 8, namely in the form of the CAM and DENM formats mentioned.

Figure 5:
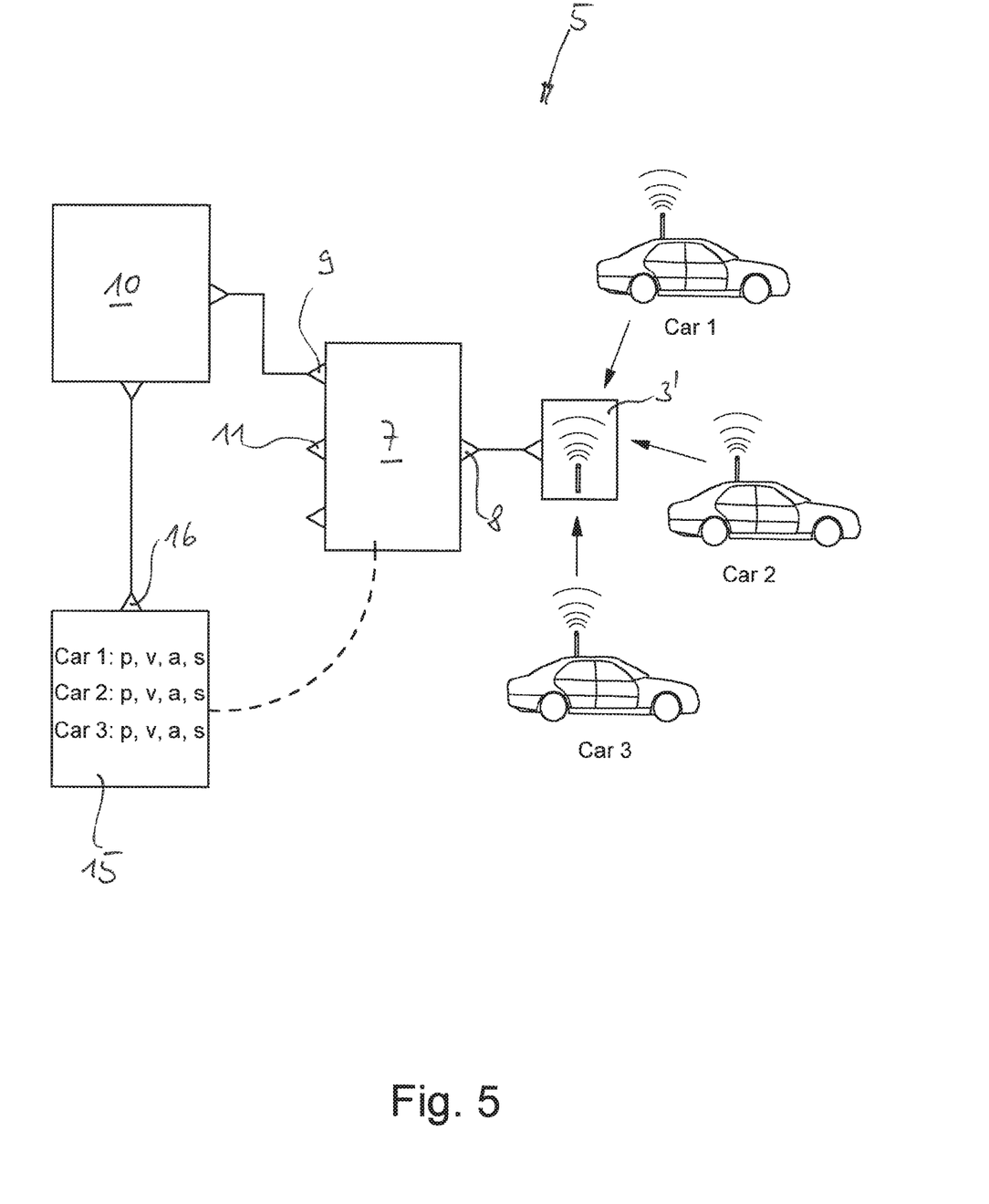
FIG. 5 shows a block diagram for modeling a V2X application with a motion profile block.

FIG. 5 shows a typical application case in which multiple other vehicles, here labeled Car1, Car2, and Car3, are located in receiving range of the radio adapter 3 or of the model of the radio adapter 3', and in this respect the radio adapter 3, 3' receives data from the other vehicles Car1, Car2, and Car3. The block diagram 5 has a V2X motion profile block 15, which likewise serves to implement a V2X application in the block diagram 5, wherein the V2X motion profile block 15 has a motion data interface 16 by means of which motion data p, v, a can be provided from data received from other vehicles Car1, Car2, Car3. It is evident that these motion data from the other vehicles Car1, Car2, and Car3 are stored in the V2X motion profile block 15 and are made available to other parts of the block diagram 5 through this V2X motion profile block 15.

In the example shown, the V2X motion profile block 15 is connected to the application unit 10. The dashed connection between the V2X motion profile block 15 and the V2X communication block 7 indicates that, in the exemplary embodiment shown, the V2X communication block 7 likewise has access to the motion data p, v, a, even without this being made clear here with a signal line connection. The motion data here include the position p, the velocity v, and the acceleration a of the applicable other vehicle Car1, Car2, and Car3. Additional data from the other vehicles Car1, Car2, and Car3 may also be stored in the V2X motion profile block 15; here it is the status information s, in which it is possible to store in encoded form whether the other vehicle is an emergency vehicle, whether the emergency vehicle is responding to an emergency, etc. The motion data can also include the direction of motion, which can be extracted from vector velocity information, for example.

Figure 6:
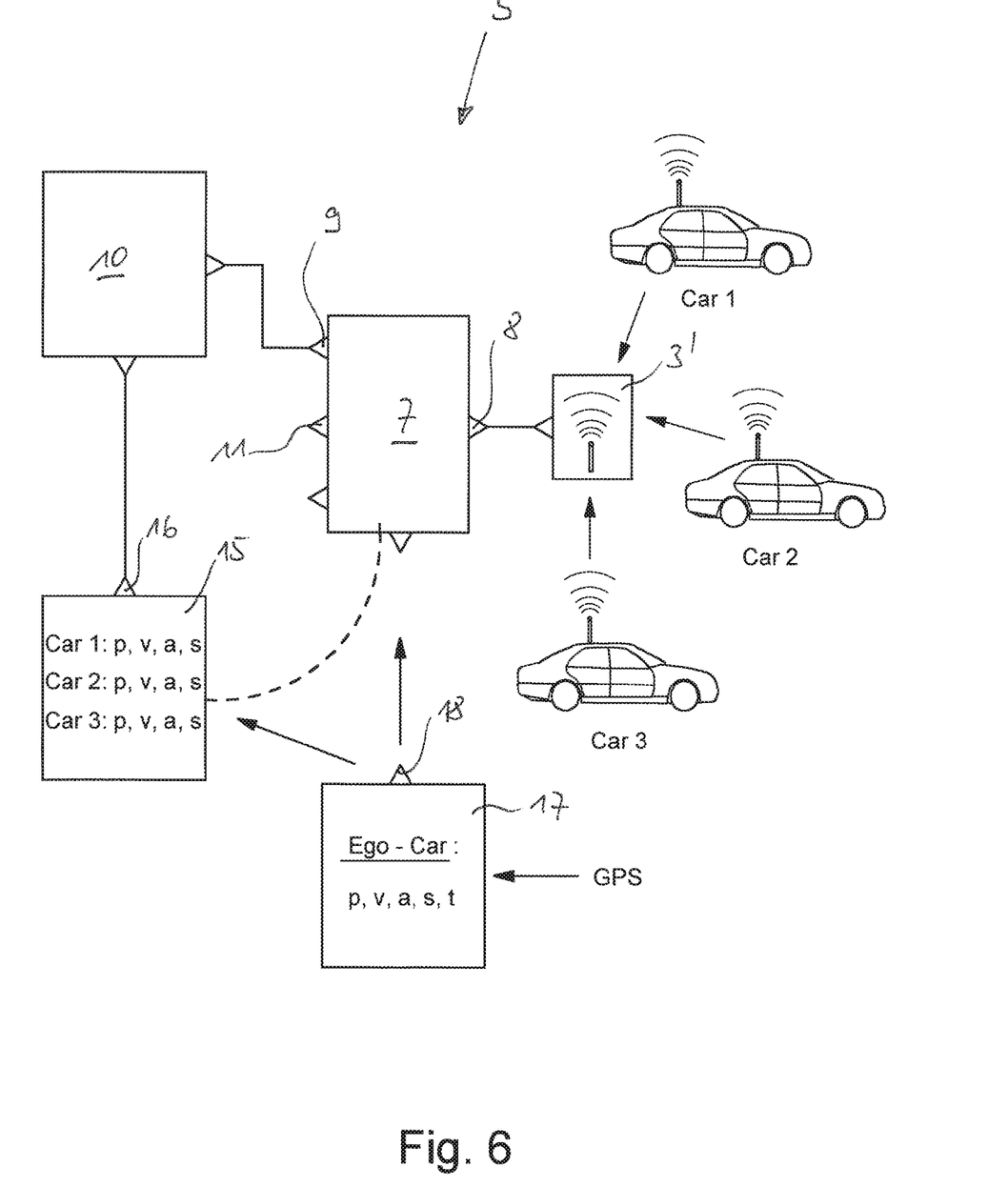
FIG. 6 shows a block diagram for modeling a V2X application with a same-vehicle motion profile block.

FIG. 6 shows a V2X application that is modeled and to be implemented, in which a V2X same-vehicle motion profile block 17 is provided, wherein the V2X same-vehicle motion profile block has a motion data interface 18 by means of which the vehicle's own motion data—not shown here—can be provided, wherein the motion data in the present case include the position p, the velocity v, the acceleration a, and the direction of motion derived therefrom. Just as in the case of the V2X motion profile block 15, the V2X same-vehicle motion profile block 17 can also include additional data, such as, e.g., status information s and the time t. The information may originate from a GPS receiver of the vehicle itself, for example. In this way, the vehicle's own motion data can be made available to the V2X application within the block diagram 5 and hence naturally also in the transferred V2X application on the target hardware 2.

Figure 7:
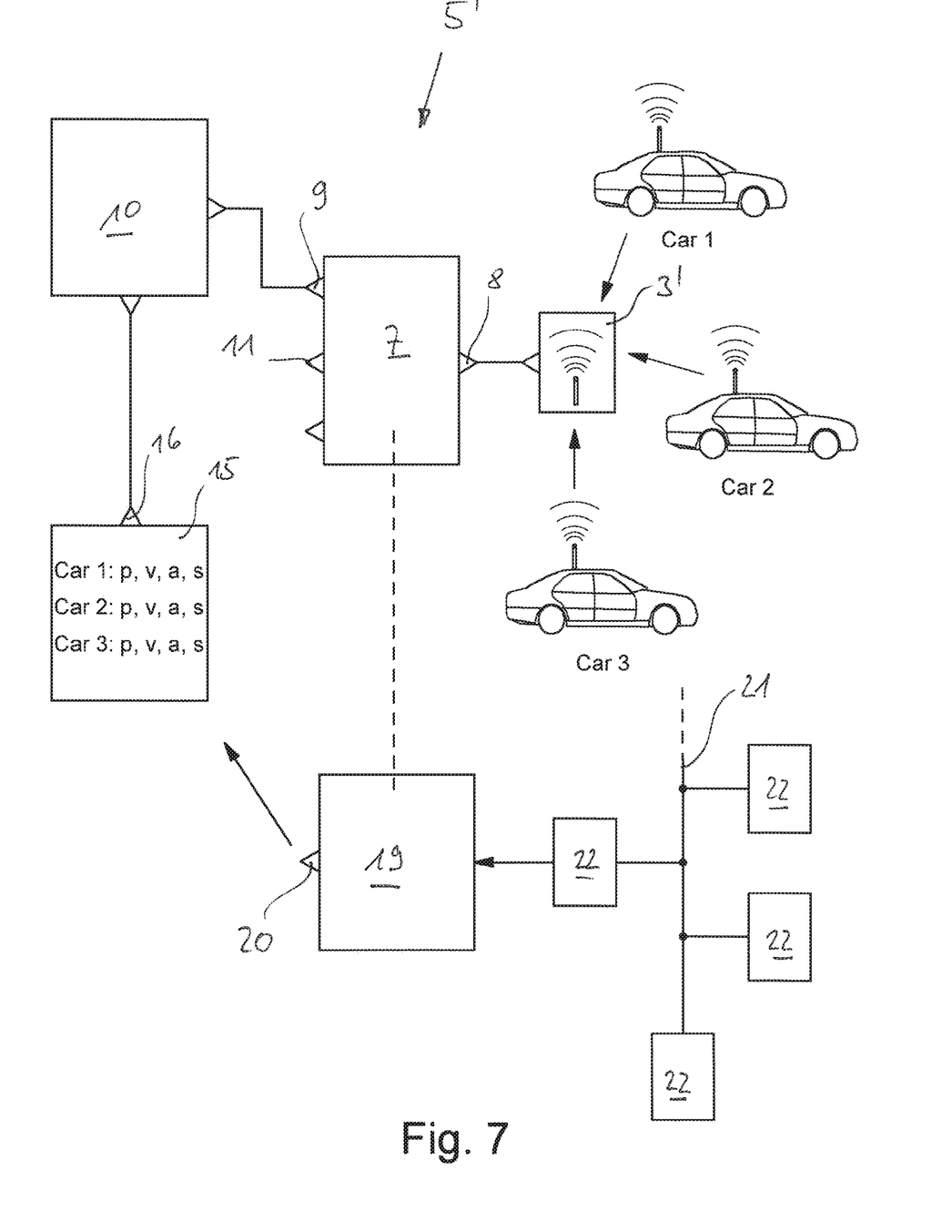
FIG. 7 shows a block diagram for modeling a V2X application with a same-vehicle data bus block.

FIG. 7 shows the use of a V2X same-vehicle data bus block 19 in the block diagram 5, wherein the V2X same-vehicle data bus block 19 has at least one data bus data interface 20 by means of which data from the vehicle's own data bus 21 may be provided. The data can be provided specifically to the V2X communication block 7, but the data can also be made available to other parts of the block diagram. Accordingly, when the block diagram 5 is transferred into a V2X program 6 and when this V2X program 6 is executed on the target hardware 2, access to the data of the data bus 21 of the real vehicle is possible by means of the transferred functionality of the V2X same-vehicle data bus block 19. These data can then likewise be used within the framework of the V2X application. The data bus 21 is a data bus that serves to network the vehicle control units 22. In the exemplary embodiment shown, the data bus 21 is a CAN bus.

Figure 8:
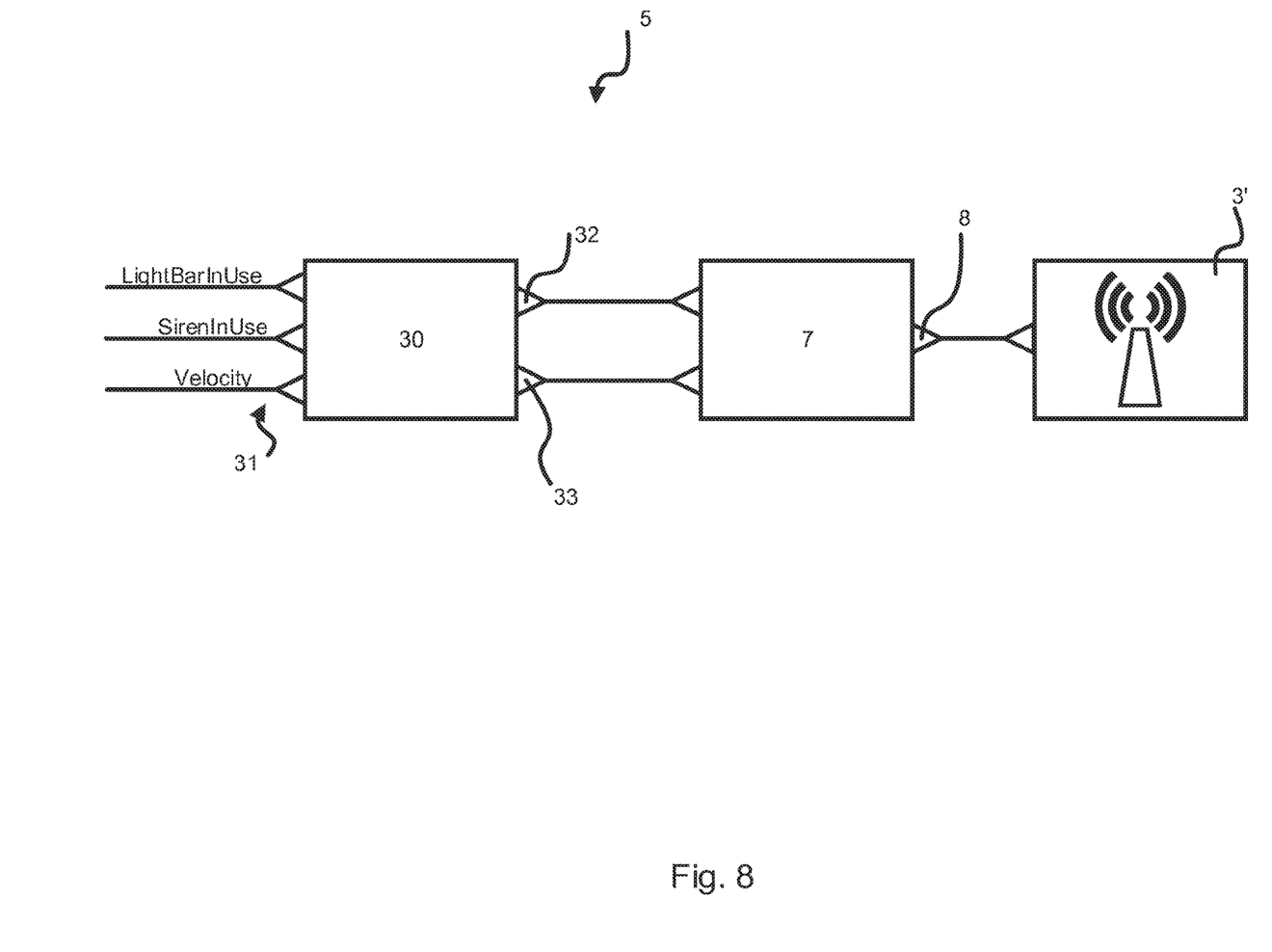
FIG. 8 shows a block diagram for modeling a V2X application with a trigger block.

FIG. 8 shows the use of a V2X trigger block 30 in the block diagram 5. The V2X trigger block 30 has multiple ports of a trigger input interface 31, and has a trigger output interface 32. In addition, the V2X trigger block 30 has internal trigger logic, wherein the internal trigger logic analyzes information received through the trigger input interface 31 and, as a function of the information received, outputs a trigger signal through the trigger output interface 32, which in the present case serves to initiate the sending of a message. In addition, the V2X trigger block 30 also has a message output 33, through which the type of message to be sent is output. In the application case shown, the signals of an ambulance are processed through the three ports of the trigger input interface 31, namely the status information "LightBarinUse," "SirenInUse," and "Velocity." This information is processed by the trigger logic, and a trigger signal for sending a message is output as a function thereof, as is the type of message, for example "ambulance actively responding at velocity v."

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for implementing a vehicle-to-environment (V2X) application on target hardware having a radio adapter, the method comprising:
modeling the V2X application in the form of a block diagram is a graphical modeling environment;

creating a V2X communication block in the block diagram, the V2X communication block having a radio adapter interface via which radio data are exchanged between a modeled radio adapter of the block diagram and the V2X communication block, the V2X communication block having a transmit rate interface;

translating the block diagram into a V2X program that is executable on the target hardware;

transferring the V2X program to the target hardware; and executing the V2X program, wherein one of a plurality of transmit rates at which the V2X communication block transmits data to the radio adaptor is specified to the V2X communication block through the transmit rate interface, the plurality of transmit rates includes a highest transmit rate and other transmit rates which are fractional multiples of the highest transmit rate, the other transmit rates only being available to be specified through the transmit rate interface based on an information density of the V2X communication block.

2. The computer-implemented method according to claim 1, wherein the V2X communication block exchanges data with an application unit through at least one application interface.

3. The computer-implemented method according to claim 1,
wherein protocol description data are transmitted to the V2X communication block through at least one protocol interface, and
wherein the communication functionality of the V2X communication block is at least partly defined by the protocol description data.

4. The computer-implemented method according to claim 1, wherein at least one of the following interfaces is implemented as a port of the V2X communication block: application interface and/or protocol interface.

5. The computer-implemented method according to claim 1, wherein the radio adapter interface of the V2X communication block is implemented on a protocol level above the bit transfer layer of an Open System Interconnection (OSI) reference model.

6. The computer-implemented method according to claim 1, wherein the communication between the V2X communication block and the radio adapter is implemented using a User Datagram Protocol (UDP) or Transmission Control Protocol (TCP) network protocol.

7. The computer-implemented method according to claim 1, wherein the V2X communication block cyclically transmits and/or receives data through the radio adapter interface.

8. The computer-implemented method according to claim 1, wherein the V2X communication block transmits and/or receives data in an event-driven manner through the radio adapter interface.

9. The computer-implemented method according to claim 1,
wherein, in order to create the block diagram, a V2X motion profile block is used that has at least one motion data interface via which motion data are provided from data received from other vehicles, and
wherein the motion data include: position, velocity, acceleration, and/or direction of motion.

10. The computer-implemented method according to claim 1,
wherein, in order to create the block diagram, a V2X same-vehicle motion profile block is used that has at least one motion data interface via which the vehicle's own motion data are provided, and
wherein the motion data include: position, velocity, acceleration, and/or direction of motion.

11. The computer-implemented method according to claim 1,
wherein, in order to create the block diagram, a V2X same-vehicle data bus block is used that has at least one data bus data interface via which data from the data bus of the same vehicle are provided or are provided to the V2X communication block, and
wherein the data bus is a data bus for networking the vehicle control units.

12. The computer-implemented method according to claim 1, wherein, in order to create the block diagram, a V2X trigger block is used that has at least one trigger input interface, at least one trigger output interface, and internal trigger logic, and wherein the internal trigger logic analyzes information received through the trigger input interface and, as a function of the information received, outputs a trigger signal through the trigger output interface to initiate the sending of a message.

13. The computer-implemented method of claim 1, wherein each of the plurality of transmit rates is transmitted from the radio adaptor.

14. The computer-implemented method of claim 1, wherein the other rates are ½, ⅕, and ⅒ the rate of the highest rate.

15. A computer system comprising:
a hardware processor and a memory configured to implement a graphical modeling, environment, the graphical modeling environment configured to create a vehicle-to-environment (V2X) communication block for implementing a V2X application in the form of a block diagram,
wherein the V2X communication block has at least one radio adapter interface via which data is exchangeable between the V2X communication block and a modeled radio adapter of the block diagram, and at least one transmit rate interface through which a rate the V2X communication block transmits data to the radio adapter is specified to the V2X communication block, the rate being one of a plurality of transmit rates available to be specified through the transmit rate interface,
wherein the block diagram is translated into a V2X program that is executable on a target hardware having a radio adapter,
wherein the V2X program is transferred to the target hardware,
wherein the V2X program is executed, and
wherein the plurality of transmit rates includes a highest rate and other rates which are fractional multiples of the highest rate, the other rates only being available to be specified through the transmit rate interface based on an information density of the V2X communication block.

16. The computer system according to claim 15, wherein the V2X communication block has an application interface via which data is exchangeable with an application unit when the application unit is part of the block diagram.

17. The computer system according to claim 15,
wherein the V2X communication block has at least one protocol interface through which protocol description data is transmitted to the V2X communication block, and
wherein the communication functionality of the V2X communication block is at least partly defined by the protocol description data.

18. The computer system according to claim 15, wherein at least one of the following interlaces is implemented as a port of the V2X communication block: application interface and/or protocol interface.

19. The computer system according to claim 15, wherein the data is sent in a cyclical and/or event-driven manner through the radio adapter interface.

20. The computer system according to claim 14, wherein the V2X communication block has a trigger input interface and a message input interface via which a trigger signal and a textual message are input respectively from a V2X trigger block, and
   wherein the V2X communication block outputs the textual message through the radio adapter interface when the trigger signal is received.

21. A computer system comprising:
   a hardware processor and configured to implement a graphical modeling environment, the graphical modeling environment configured to create a vehicle-to-environment (V2X) communication block for implementing a V2X application in the form of a block diagram,
   wherein the V2X communication block has at least one radio adapter interface via which data is exchangeable between the V2X communication block and a modeled radio adapter of the block diagram, and
   wherein the V2X communication block has at least one transmit rate interface through which a decentralized congestion control (DCC) block of the block diagram specifies to the V2X communication block a rate the V2X communication block transmits data to the radio adapter, the rate being one of a plurality of transmit rates available to be specified by the DCC block through the transmit rate interface,
   wherein the block diagram is translated into a V2X program that is executable on a target hardware having a radio adapter,
   wherein the V2X program is transferred to the target hardware,
   wherein the plurality of transmit rates includes a highest rate and other rates which are fractional multiples of the highest rate, the other rates only being available to be specified through the transmit rate interface based on an information density of the V2X communication block.

22. The computer system according to claim 21,
   wherein the computer system further creates a V2X motion profile block in the block diagram,
   wherein the V2X motion profile block has at least one motion data interface via which motion data from data received from other vehicles is provided, and
   wherein the motion data include at least one of the following information items: position, velocity, acceleration, and/or direction of motion.

23. The computer system according to claim 21,
   wherein the computer system further creates a V2X same-vehicle motion profile block in the block diagram,
   wherein the V2X same-vehicle motion profile block has at least one motion data interface via which the vehicle's own motion data is provided, and
   wherein the motion data include at least one of the following information items: position, velocity, acceleration, and/or direction of motion.

24. The computer system according to claim 21,
   wherein the computer system further creates a V2X same-vehicle data bus block in the block diagram,
   wherein the V2X same-vehicle data bus block has at least one data bus data interface via which data from the data bus of the same vehicle is provided or is provided to a V2X communication block, and
   wherein the data bus is a data bus for networking the vehicle control units.

25. The computer system according to claim 21,
   wherein the computer system further creates a V2X trigger block in the block diagram, and
   wherein the V2X trigger block comprises:
      at least one trigger input interface;
      at least one trigger output interface;
      a message output interface; and
      an internal trigger logic that analyzes information received through the trigger input interface and, as a function of the information received, outputs to a V2X communication block a trigger signal through the trigger output interface and a textual message related to the information through the message output interface so that the trigger signal causes the V2X communication block to initiate to output the textual message.

* * * * *